US012775597B2

(12) United States Patent
Sharpe et al.

(10) Patent No.: US 12,775,597 B2
(45) Date of Patent: Oct. 27, 2026

(54) EFFICIENT ANOMALY DETECTION FOR HIGH VOLUME OPERATIONS

(71) Applicant: Capital One Services, LLC, McLean, VA (US)

(72) Inventors: Samuel Sharpe, Somerville, MA (US); Christian Schwantes, Oilville, VA (US); Stephen M. George, Dumfries, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/912,277

(22) Filed: Oct. 10, 2024

(65) Prior Publication Data

US 2026/0105032 A1 Apr. 16, 2026

(51) Int. Cl.
*G06F 16/21* (2019.01)
*G06F 16/23* (2019.01)

(52) U.S. Cl.
CPC ........ *G06F 16/213* (2019.01); *G06F 16/2365* (2019.01); *G06F 16/2379* (2019.01)

(58) Field of Classification Search
CPC ............... G06F 11/079; G06F 11/0736; G06F 11/0709; G06F 16/285; G06F 2201/86; G06F 2201/87
See application file for complete search history.

(56) References Cited

U.S. PATENT DOCUMENTS 10,862,518 B1 * 12/2020 Labadie ................... H04B 1/18
10,917,520 B1 * 2/2021 T. G .................... H04M 3/5233
11,204,824 B1 * 12/2021 Tiwari ................ G06F 11/0793
2011/0307381 A1 * 12/2011 Kim ....................... G06Q 20/12 705/44
2013/0205007 A1 * 8/2013 Ayachitula ............ G06F 9/5072 709/224
2014/0229719 A1 * 8/2014 Smeets ................. G06F 9/3848 712/239
2016/0092290 A1 * 3/2016 Gerstl ................ G06F 11/0787 714/37
2017/0228401 A1 * 8/2017 Brew .................... G06F 16/211
2019/0347132 A1 * 11/2019 Hursh ................... G06F 3/0664
2020/0259861 A1 * 8/2020 Margel ..................... H04L 63/20
2021/0049418 A1 * 2/2021 Zhao .................... G06N 3/0895
2021/0342215 A1 * 11/2021 Chawla ................. G06F 11/079
(Continued)

*Primary Examiner* — Ashish Thomas
*Assistant Examiner* — Catherine Marie Nguyen
(74) *Attorney, Agent, or Firm* — Foley & Lardner LLP

(57) ABSTRACT

A method and related system for reducing computational cost when applying anomaly detection during high volume transaction processes includes detecting event motifs based on a shared occurrence of the event motifs across historical event sequences, grouping the event motifs based on the set of failures into at least a first motif dictionary associated with a first category and a second motif dictionary associated with a second category. The method further includes performing a search on an event sequence for a record based on the first motif dictionary and the second motif dictionary to determine a motif profile and selecting the first category based on the motif profile. The method further includes determining whether a set of values of the record satisfy a set of failure criteria associated with the first category and, if so, modifying the record based on an action mapped to the first category.

20 Claims, 3 Drawing Sheets

(56) References Cited

U.S. PATENT DOCUMENTS

| | | | | |
|---|---|---|---|---|
| 2022/0084033 | A1* | 3/2022 | Walters | H04L 63/102 |
| 2022/0400124 | A1* | 12/2022 | Chasdai | H04L 41/16 |
| 2023/0025946 | A1* | 1/2023 | Li | H04L 41/145 |
| 2023/0153430 | A1* | 5/2023 | Jin | G06F 21/56<br>726/23 |
| 2024/0152400 | A1* | 5/2024 | Posner | G06F 9/5072 |
| 2024/0411781 | A1* | 12/2024 | Noto | G06F 16/285 |
| 2025/0217222 | A1* | 7/2025 | Som | G06F 11/0769 |

* cited by examiner

EFFICIENT ANOMALY DETECTION FOR HIGH VOLUME OPERATIONS

SUMMARY

High Volume Transaction Processing (HVTP) operations are a critical for various industrial and commercial systems. An HVTP system provides critical services for telecommunication systems, cybersecurity systems, energy management systems, and financial services systems. Unfortunately, the high volume nature of HVTP operations can create unique challenges to detecting unexpected anomalies, unintended errors, or undesirable activities. Anomaly detection technology that could be used in isolation for a single data stream are often far too computationally expensive when scaled up to being performed for thousands or even hundreds of thousands of operations per second. However, simple event or difference-based detection operations are often far too basic to reliably detect longer-term issues.

Some embodiments may overcome such problems to improve anomaly detection in high volume operations by using event motif clusters to detect issues in HVTP or categorize database records updated during HVTP operations. Some embodiments may further use motif clusters to detect more sophisticated issues and detected patterns or detected pattern clusters to enable or disable one or more operations. Some embodiments may detect event motifs based on shared occurrences of the event motifs across a plurality of event histories. Some embodiments may group the event motifs into a set of motif dictionaries based on the set of failure types, such as a first motif dictionary associated with a first category (e.g., a first failure type) and a second motif dictionary associated with a second category. Some embodiments may then obtain a request to modify a record during high volume operations and perform a pattern matching search on an event sequence of the record based on the first motif dictionary and the second motif dictionary to determine a motif profile. The motif profile may indicate a first count of matching motifs for the first motif dictionary and a second count of matching motifs for the second motif dictionary.

Some embodiments may determine, based on the motif profile, that the event sequence includes a motif that matches a motif of the first motif dictionary and, in response, and select the category associated with the first motif dictionary in lieu of a category associated with the second motif dictionary. Some embodiments may then determine whether one or more values of the record indicated by the request satisfy a threshold and, based on a result indicating satisfaction, may then modify the record based on the request or an action mapped to the category. Such operations may provide significant benefits in the field of digital infrastructure management (e.g., in the context of managing a set of distributed applications) by providing a way to check for anomalies.

Various other aspects, features, and advantages of the invention will be apparent through the detailed description of the invention and the drawings attached hereto. It is also to be understood that both the foregoing general description and the following detailed description are examples and are not restrictive of the scope of the invention.

Figure 1:
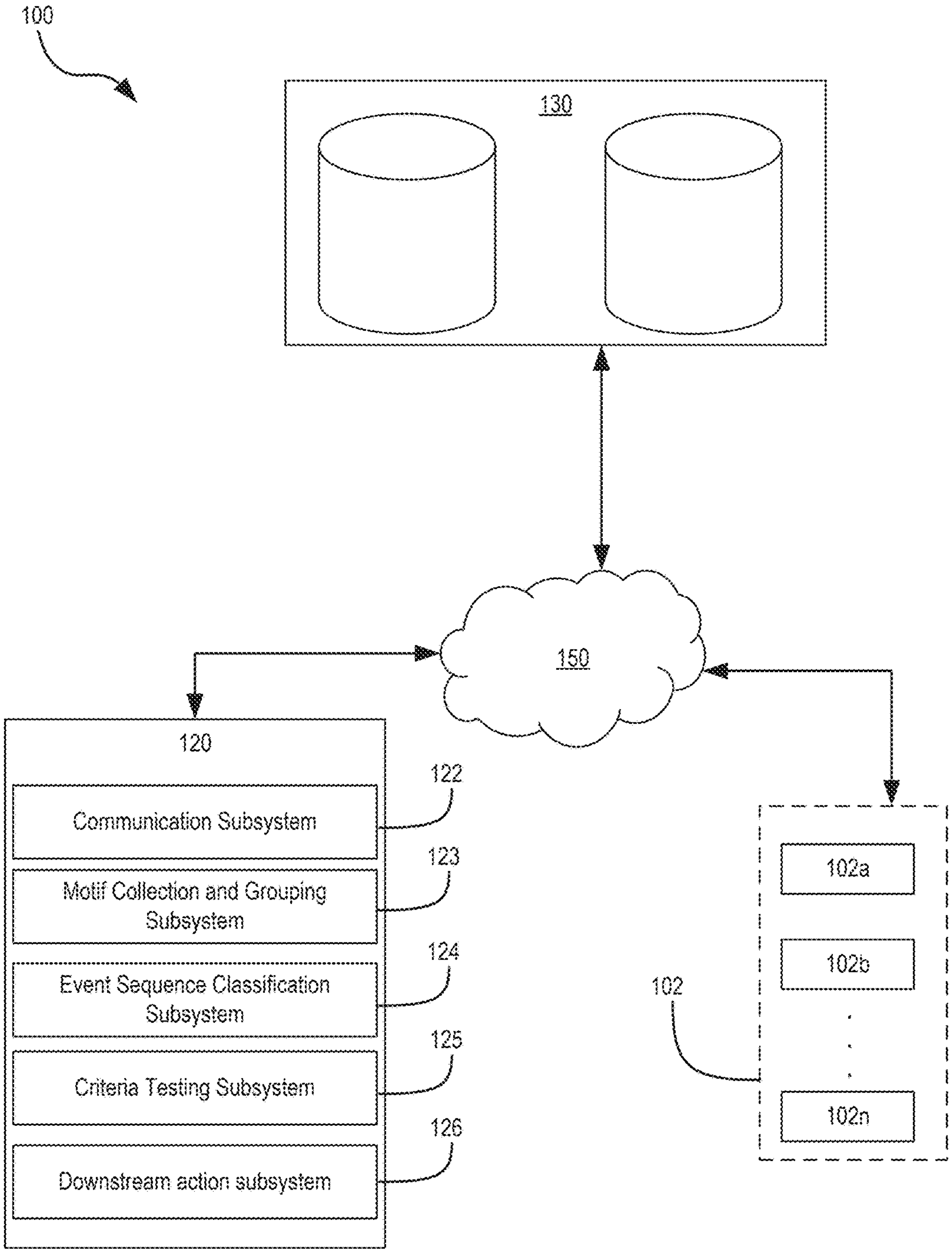
FIG. 1 shows an illustrative diagram for securely modifying records during high volume processes by using motif profiles, in accordance with one or more embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 shows an illustrative diagram for securely modifying records during high volume processes by using motif profiles, in accordance with one or more embodiments. A system 100 includes a set of client devices 102 (which includes at least a client device 102*a*, a client device 102*b*, and a client device 102*n*). in communication with a server 120 via a network 150. As will be described further in this disclosure, the server 120 may perform operations to detect errors and anomalies for event sequences updated by messages from the set of client devices 102 or other devices communicating via the network 150.

The system 100 may securely modify records during high volume processes by using motif profiles. For example, the system 100 may detect event motifs based on shared occurrences of the event motifs across a plurality of event histories. Some embodiments may retrieve event histories from a database of event sequences, where an event history may be represented as an ordered list of event codes. For example, some embodiments may obtain a set of event sequences in the form a list of strings, where each string represents a different type of event (e.g., ["A-tx-B", "B-tx-A," "A-chk", . . . ]. Some embodiments may search through the set of event sequences to determine event motifs, which are short sequences of events that are repeated across multiple event histories. For example, some embodiments may determine that the event sequence ["E1", "E2", "E5", "E2"] is repeated across 35 event sequences out of a full set of 1000 event sequences and, in response, determine that the event sequence ["E1", "E2", "E5", "E2"] is a motif and provide this motif with the label "M1. After detecting the event motifs, some embodiments may then group these motifs into different event dictionaries based on failures or other outcomes associated with their corresponding records. Some embodiments may then obtain a request to modify a record during high volume operations and determine a motif profile by analyzing an event sequence identified by the request based on the previously generated motif dictionaries. Based on analysis results indicating one or more failure types, some embodiments may determine whether to modify the record based on the request or an action mapped to the one or more failure types.

The system 100 may detect event motifs and then group these motifs into different motif dictionaries based on failures or other outcomes associated with their corresponding records. For example, some embodiments may determine that each event sequence of the event sequences storing a motif "M1" includes a failure event labeled "SHUTDOWN" and, in response, generate or update a motif dictionary to include the motif "M1" and be associated with the failure type "SHUTDOWN." Some embodiments may then determine a motif profile by analyzing an event sequence based on the motif dictionaries and one or more failure types or other outcome types associated with the event sequence. Based on the analysis results, some embodiments may determine whether a record identified in a request satisfies criteria associated with request, where such criteria may include criterion based on the motif profile. Some embodiments may then determine whether to perform an action mapped to a category (e.g., a failure type) associated with the one or more failure types or other outcome types.

The system 100 may detect event motifs and group them into dictionaries. Some embodiments may then obtain a set of requests to update one or more records during high volume transaction operations that limit available computing resources. Some embodiments may then perform a search of the set of event sequences involving the one or more records (e.g., event sequences stored as event histories within the records themselves) to determine a motif profile, where the motif profile may indicate motif-related information about the event sequence (e.g., whether a particular motif is present in an event sequence, how many times is a particular motif present, etc.). Some embodiments may then select a failure type based on the motif profile, such as by determining whether the motifs of a motif profile match with one or more motifs of a dictionary associated with the motif profile. As disclosed elsewhere in this disclosure, various other methods may be used to select one or more failure types based on a motif profile of an event sequence. Some embodiments may then determine whether a set of criteria, such as a set of criteria based on a record parameter threshold, is satisfied. For example, some embodiments may select a set of criteria associated with a failure type assigned to a record after receiving a request to modify the record. Some embodiments may then determine whether an amount stored in a field "FIELD1" of the record satisfies a minimum field threshold and shows the presence of at least one motif of a first motif dictionary. Based on the result, some embodiments may then update the record.

The system 100 may detect event motifs, group them into motif dictionaries, and assign one or more outcome types to a new or recently updated event sequence based on the motif dictionaries. Some embodiments may then determine whether to perform a downstream action (e.g., permit an action encoded in a request) based on whether a set of criteria is satisfied. For example, some embodiments may receive a request to initialize an additional container associated with an application. In response, some embodiments may review the event sequence related to the application to determine whether a set of criteria is satisfied, where the set of criteria may be determined based on whether one or more motifs from a dictionary is present in the event sequence and whether a record storing the event history includes a minimum value. Based on the outcome, some embodiments may then perform an appropriate downstream action indicated by the request or otherwise mapped to the outcome. Such actions may provide significant benefits by providing a means of effectively detecting anomalies in fields such as digital infrastructure management, processing financial transactions, healthcare management, and other high volume transaction operations.

The set of client devices 102 may include one of various types of computing devices, such as a laptop, a tablet, a desktop, etc. A user may use the set of client devices 102 to send requests, responses, or other messages to the server 120 that may require communication with other computing devices or other electronic devices. An external user may use a telecommunication device 103 to communicate (e.g., via audio conversations, video conversations, messaging via chat platform, etc.) with the user. Applications, services, or other operations may use data provided by the set of client devices 102, the server 120, or a set of databases 130. The set of databases 130 may include various types of databases, such as SQL databases, no SQL databases, graph databases, etc. The server 120 may perform operations related to subsystems 122-126. Furthermore, the set of databases 130 may store data used by operations described in this disclosure, such as event sequences, records (e.g., device records, account records, etc.).

It should be noted that the computing devices described in this disclosure may be any type of computing device unless otherwise stated, including, but not limited to, a laptop computer, a tablet computer, a hand-held computer, and/or other computing equipment (e.g., a server), including "smart," wireless, wearable, and/or mobile devices. Furthermore, the embodiments described in this disclosure may include an individual device that performs some or all the operations described in this disclosure. Alternatively, other embodiments may include multiple computing devices acting collectively to perform some or all the operations described in this disclosure.

In some embodiments, a communication subsystem 122 may obtain messages from the set of client devices 102, such as transaction requests, requests to initialize or modify the operation of a device, etc. The communication subsystem 122 may be configured to handle high volumes of incoming and outgoing data, such as more than 1000 transaction requests per second. The communication subsystem may also communicate data to different data centers, such as different motifs or different motif dictionaries. For example, some embodiments may use the communication subsystem 122 to send motif data about a version of a first motif dictionary from a first data center in a first region to a second data center to a second region. Furthermore, for a single transaction request operating under HVTP conditions, the computing resources that can be allocated to any single transaction may be high limited.

In some embodiments, a motif collection and grouping subsystem 123 may perform operations to detect event motifs and then group the detected event motifs. For example, some embodiments may determine that a first event sub-sequence and a second event sub-sequence are repeated through a first set of 35 event sequences and, in response, define a first motif "M1" as being the first event sub-sequence and a second motif "M2" as being the second event sub-sequence. Some embodiments may then associate the grouping of the motifs with one or more outcomes associated with a set of event sequences. These groupings may be defined as a motif dictionary, where a motif dictionary may be stored in a key-value pair data structure (e.g., a hash table) or may be stored in another form (e.g., a multi-dimensional array, a tuple, ordered dictionary, trees, etc.). Some embodiments may then use the motif collection and grouping subsystem 123 to determine that the first set of 35 event sequences indicates an outcome type "DENIAL" and, in response, associate the first motif dictionary with the outcome type "DENIAL."

In some embodiments, the event sequence classification subsystem 124 may perform a search of an event sequence that is incoming or recently updated to determine a motif profile and an associated set of categories for the event sequence. In some embodiments, such as when the associated set of categories indicate an anomaly, such operations are applicable to anomaly detection. For example, the communication subsystem 122 may receive a transaction request that updates an event sequence of a first record. Some embodiments may then use the event sequence classification subsystem 124 to determine a profile motif for the recently updated event sequence and associate one or more categories with the first record. For example, the event sequence classification subsystem 124 may search an event sequence for the presence and occurrences of motifs of a first motif dictionary, a second motif dictionary, and a third motif dictionary. In some embodiments, each of the motif dictionaries have different sequences and, in response to a determination that an event sequence includes a motif unique to a first motif dictionary, may associate the event sequence with a category (e.g., a failure type) associated with the first motif dictionary.

Some embodiments may use a criteria testing subsystem 125 to select one or more criteria associated with a user device and determine if one or more criteria are satisfied. For example, some embodiments may retrieve a set of criteria associated with a request, where the set of criteria may include one or more criterion associated with a motif-related value. For example, after receiving a request to increase the amount of memory to allocated to an instance of an application, some embodiments may analyze the most recent 100 events or the most recent events by time (e.g., all events within the last six months) stored in an event sequence for the application to determine whether one or more motifs of the event sequence matches a motif of a first motif dictionary labeled with the outcome type "MEMORY INCREASED." The criteria testing subsystem 125 may then retrieve a first criterion associated with the request, where the first criterion may require that at least one motif of the first motif dictionary is detected within the last six month, and further that the current memory allocated to the application does not exceed a maximum memory threshold. In response to a determination that at least one motif of the first motif dictionary is found in the last six months of the event sequence and that the current memory allocated does not exceed the maximum memory threshold, some embodiments may then perform one or more downstream actions based on this result (e.g., permit the allocation of memory).

Some embodiments may use a downstream action subsystem 126 to perform one or more actions. For example, some embodiments may use the downstream action subsystem 126 to lock a record to prevent further updates to the record. Alternatively, or additionally, some embodiments may use the downstream action subsystem 126 to modify a value in a record field. Furthermore, some embodiments may modify the metadata associated with a record.

Some embodiments may use the downstream action subsystem 126 to perform actions to distribute or update a motif dictionary. For example, some embodiments may use the motif collection and grouping subsystem 123 to update an existing motif dictionary to add a new motif to the motif dictionary. Some embodiments may use the downstream action subsystem 126 to determine that the new motif is detected in the course of analyzing a recently updated event sequence and, in response, distribute the updated motif dictionaries to other data centers in other regions.

Figure 2:
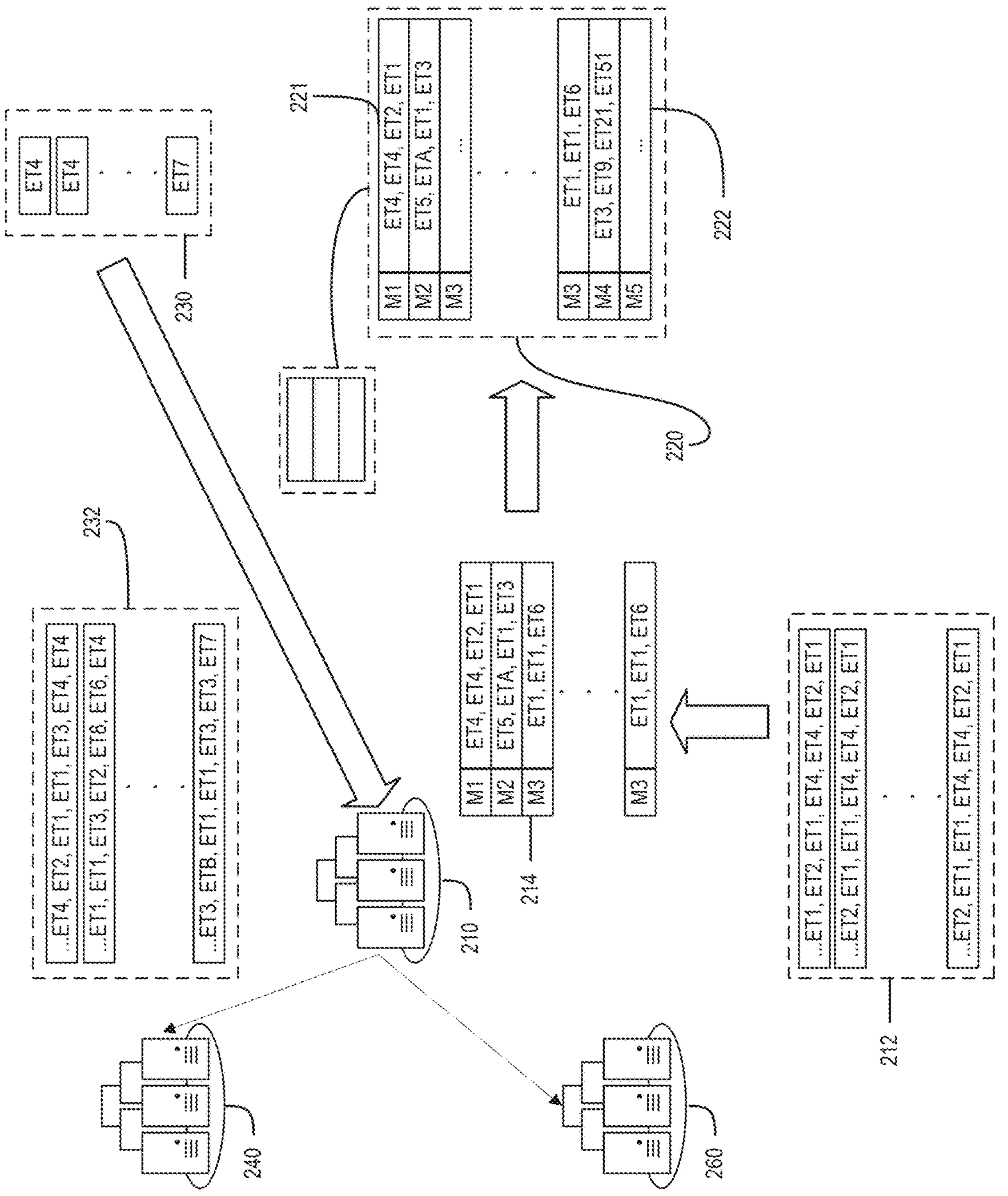
FIG. 2 shows an illustrative diagram for an architecture for securely modifying records during high volume processes by using motif profiles, in accordance with one or more embodiments.

FIG. 2 shows an illustrative diagram for an architecture for securely modifying records during high volume processes by using motif profiles, in accordance with one or more embodiments. The distributed data center system 200 shows a first data center 210, a second data center 240, and a third data center 260. At a first time, the first data center 210 may analyze a set of event histories 212 to find common motifs that repeat themselves through out two or more event sequences in the set of event histories 212. These common motifs can be collected into a set of motifs 214. Some embodiments may then separate or otherwise categorize the set of motifs 214 to determine a set of motif dictionaries 220, such as a first motif dictionary 221 and a second motif dictionary 222.

During real-world operations, high volumes of transaction requests 230 may be provided to the first data center 210 for processing to update recently updated event sequences 232. The computing resources available to test each transaction for errors or anomalies may be extremely limited, which may restrict the applicability of sophisticated machine learning models or other high-computing-resource methods during real-time operations. Some embodiments may use the set of motif dictionaries 220 to determine motif profiles for each event sequence of the recently updated event sequences 232 updated by the transaction requests 230. The first data center 210 may then categorize the event sequences for one or more records associated with each sequence of the recently updated event sequences 232 by mapping the same outcome types (e.g., failure type categories, categories indicating other anomalies) associated with a motif dictionary with the one or more record. For example, if a record is associated with the event sequence 232 and the event sequence 232 includes a unique motif of the first motif dictionary 221, and the first motif dictionary 221 is associated with the outcome type "FAIL1," then the first data center 210 may associate the record of the event sequence 233 with "FAIL1."

In some embodiments, the first data center 210 may dynamically update the set of motifs 214 and the set of motif dictionaries 220 by searching for common motifs in the event sequence of the recently updated event sequences 232. For example, the first data center 210 may detect that the motif "["ET1", "ET1", "ET3"]" is a new common motif based on the event sequence of the recently updated event sequences 232, and that the sequences having this new motif all indicate the outcome type "FAILY." In response, some embodiments may update the first motif dictionary 221 to include the new common motif.

In some embodiments, the first data center 210 may broadcast the set of motif dictionaries 220 to the second data center 240 or the third data center 260. By sharing its own version of the set of motif dictionaries 220, the first data center 210 may distribute updates to the set of motif dictionaries 220. Such operations can help ensure that real-time modifications to a grouping of motifs are not limited to transactions occurring in a single geographic region but can instead be shared to multiple regions.

Figure 3:
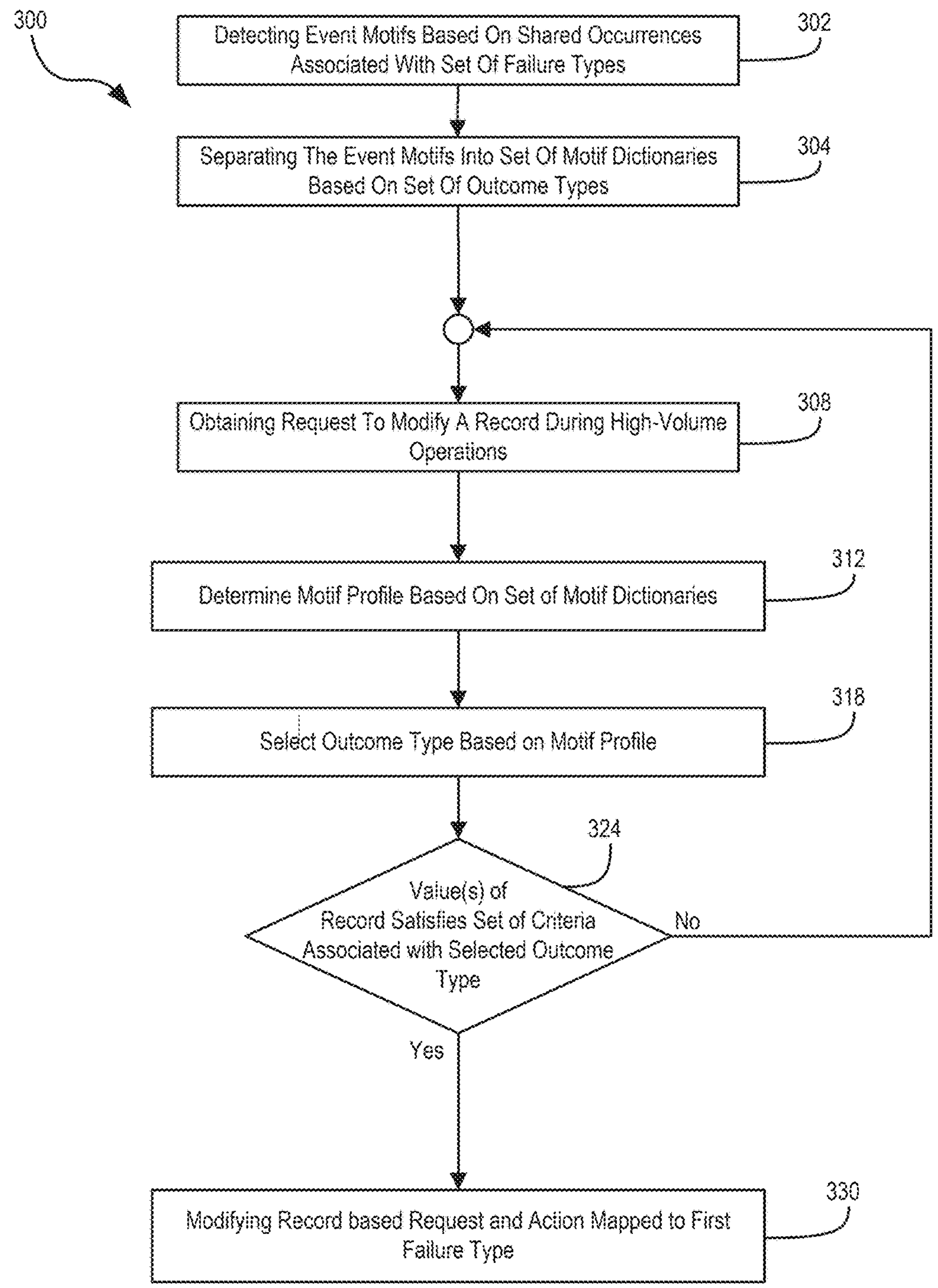
FIG. 3 shows a flowchart of a process for securely modifying records during high volume processes by using motif profiles, in accordance with one or more embodiments.

FIG. 3 shows a flowchart of a process for securely modifying records during high volume processes by using motif profiles, in accordance with one or more embodiments. Some embodiments may detect event motifs based on shared occurrences associated with a set of outcome types, as indicated by block 302. An outcome type may be used to categorize various types of outcomes, such as specific failures (e.g., a failure type indicating a device failure or a failure to prevent fraudulent behavior), permitted changes to a record, etc.

Some embodiments may review a set of event histories, wherein event history may be represented as a sequence of events. For example, some embodiments may access a set of event histories stored as multiple lists of events represented by event codes, where each respective list of event codes may be stored in a respective record. A sequence of events for a record may be associated with one or more particular outcomes, where an outcome may include a separate category associated with the record or may be stored in the sequence of events itself as an event. For example, some embodiments may store a record lock event in the sequence of events. Alternatively, or additionally, a record during the sequence of events may include a separate category or other separate field to indicate that a record lock occurred for the sequence of events.

Some embodiments may detect the event motifs based on a detected number of common events. For example, some embodiments may group event sequences based on having a number of shared motifs. Some embodiments may search through a set of event histories to obtain a subset of the histories, where the subset of the event histories all include a set of candidate motifs. It should be understood that detecting event histories and grouping them into subsets of event histories based on a shared set of candidate motifs may be performed in an iterative fashion. For example, some embodiments may determine that a first group of five event histories share a first set of motifs and that a second group of event histories share a second set of motifs. Some embodiments may then select the group of event histories that share an outcome.

Some embodiments may search and detect motifs from event histories or other sequences of events based on a rate of cooccurrence for one or more motifs. For example, some embodiments may determine that a rate of cooccurrence of a motif of a subset of event histories sharing an outcome type is greater than a minimum cooccurrence threshold. In response, some embodiments may update a motif dictionary to include the motif and, if not already associated, associate the motif dictionary with the outcome type. For example, some embodiments may determine that a rate of cooccurrence of a first motif "[E1, E5, E1, E4]" in a subset of event histories or sharing a first failure type indicating device hardware failure is greater than a minimum cooccurrence threshold of 90%. In response, some embodiments may update a first motif dictionary to include the first motif "[E1, E5, E1, E4]" and associate the first motif dictionary with the first failure type.

Some embodiments may detect motifs in groups of motifs based on shared outcomes. For example, some embodiments may filter a plurality of event histories that share a failure type indicating that an operation was canceled for lack of computing resources. Some embodiments may then search through this subset of event histories to group event motifs that are present in a threshold number of the subset of event histories, such as two or more event histories. Some embodiments may then update (e.g., generate or modify) one or more motif dictionaries to include the detected motifs.

Some embodiments may further store an order of the motifs in a motif profile, where one or more non-motif event sequence segments may be between motifs in an ordered set of motifs. For example, some embodiments may determine that an event sequence includes a motif sequence "["M4", "M1", "M4"]. Furthermore, some embodiments may generate multiple motif dictionaries that are associated with a same outcome type. Some embodiments may generate multiple motif dictionaries by detecting that a subset of event sequences that are all associated with an outcome type may be further separated into two or more sub-subsets having at least one unique motif to that sub-subset. For example, some embodiments may determine that a first subset of event sequences may be split into a first sub-subset sharing the motifs "M1," "M2," and "M3," and a second sub-subset sharing the motifs "M1," "M3," and "M4."

Alternatively, some embodiments may store motifs in an unordered set. For example, some embodiments may store motifs in an unordered hash table, where a motif name (e.g., "M1") may be paired with an event sequence representing the structure of the motif (e.g., "[E1, E2, E5, E3]"). Storing and using motif dictionaries structured in an unordered set may provide faster services in cases where the order of motifs is not used to determine a motif profile.

Some embodiments may separate event motifs into a set of motive dictionaries based on the set of outcome types, as indicated by block 304. As disclosed elsewhere in this disclosure, various methods may be used to determine motifs that are shared between different sequences. Some embodiments may then update a motif dictionary to include those motifs and associate the motif dictionary with one or more outcome types associated with those different sequences.

As described elsewhere in this disclosure, some embodiments may have detected event motifs based on a detected number of common events. After grouping event sequences into a subset of the event histories based on having a number of shared motifs, some embodiments may determine whether the subset of events histories indicate a particular outcome type, such as a failure type indicating a record-locking event or a failure type indicating a transaction reversal. Some embodiments may then update (e.g., generate or modify) a motif dictionary that associates the motif dictionary with that particular outcome type and ensures that the number of shared motifs are included in the motif dictionary.

In some embodiments, an outcome type may also be used as a classification category to indicate downstream action. An outcome type may be an action type or may be directly associated with an action type indicating a downstream action to be performed. For example, a computer system may associate a motif dictionary with a first outcome type indicating gift card fraud (e.g., a failure type labeled "GIFT_CARD_FRAUD"). In response, the computer system may begin a set of operations associated with the first outcome type assigned with a label "LOCK_RECORD." Alternatively, some embodiments may use an outcome type that directly effectuates a set of downstream actions without explicitly being linked to an action type. For example, a computer system may associate a motif dictionary with a first outcome type indicating a record lock such that, when a motif profile for a record is associated with the first outcome type, the computer system may label the record with the first outcome type and lock the record.

As described elsewhere in this disclosure, some embodiments may have moved sequences based on a rate of shared cooccurrence of motifs. For example, some embodiments may have detected that, within a subset of event histories associated with a first failure type indicating a transaction reversal within the last 10 days, 55% of the subset of event histories include a set of five motifs, where a minimum cooccurrence threshold is 50%. Because the rate of cooccurrence for the set of five motifs for the subset of event histories is greater than the minimum cooccurrence threshold, some embodiments may generate or modify the first motif dictionary that includes the set of five motifs and associate the first motif dictionary with the first failure type.

Some embodiments can update one motif dictionary based on similarities in outcomes or downstream actions with another motif dictionary by adding a set of additional motifs to the motif dictionary. For example, some embodiments may detect an indication that a first action type associated with a failure type is mapped to one or more other failure types. In response, some embodiments may determine whether motif dictionaries associated with the one or more other failure types include any new motifs and, if so, add the new motifs to a first motif dictionary associated with the first action type. By adding a set of additional motifs to a motif dictionary, some embodiments may create a more comprehensive/broad motif dictionary that may more widely applicable without losing the mapping to an appropriate downstream action.

Some embodiments may obtain a request to modify a record during volume operations, as indicated by block 308. As described elsewhere in this disclosure, HVTP operations post unique challenges to computing operations. Sophisticated detection algorithms based on deep neural networks or complex, multi-layered, rule-based decision systems may often become infeasible when applied to high volume operations. In contrast, the sophisticated use of lower-level algorithms may provide acceptable degree of accuracy or anomaly detection purposes without becoming infeasible at high transaction volumes.

In some embodiments, a request to modify the record may include a general transaction operation that modifies one or more values of the record. For example, some embodiments may receive a request to effectuate a transfer of an amount from a first account record to a second account record. Alternatively, or additionally, the request to modify the record may modify metadata associated with the record. For example, some embodiments may receive a request to modify a maximum allocation value associated with the record, where the record may represent the state of a computing resource (e.g., a record indicating and controlling the number of memory devices, processor devices, and other computing resources assigned to an application).

In some embodiments, a request may include one or more criteria. Alternatively, or additionally, operations based on the request may include applying one or more criteria. Detecting and using motifs may provide a faster, more efficient way to retrieve the one or more criteria or satisfy the one or more criteria. Furthermore, in cases where an initial message effectuates a database transaction during a HVTP operations, some embodiments perform operations described in this disclosure (e.g., operations to detect the event motifs or determine motif profiles) without requiring a separate request to modify a special field of a record. For example, some embodiments may receive a transaction message indicating an increase in a field amount of a first record and a decrease in the field amount of a second record. In response to obtaining the transaction message, the computer system may detect one or more event motifs and determine whether to perform one or more downstream operations based on the one or more event motifs. For example, some embodiments may determine whether to (i) reverse a database transaction in the message and (ii) send an alert to a user indicating the transaction or an identifier of a record affected by the transaction in response to detecting an event motif in an event dictionary indicating anomalous activity.

Some embodiments may dynamically evolve a database record based on new, incoming data. As described elsewhere in this disclosure, some embodiments may update multiple event sequences in high volume operations. In many cases, new motifs can appear and can then be incorporated into an existing motif dictionary associated with an outcome or can be used to form a new motif dictionary. For example, after obtaining a plurality of transactions during high volume operations, a computer system may update multiple event sequences to obtain a plurality of recent event sequences. The recent event sequences may be time limited based on a pre-defined duration, where a pre-defined duration may include a duration equal to or less than one day, one month, three months, one year, or some other pre-defined duration. Some embodiments may then determine one or more outcome types (e.g., failure types, record modification types, etc.) associated with the recent event sequences and search through them for a set of common motifs not initially in the first motif dictionary. Some embodiments may then update a set of motif dictionaries to add a motif from the set of common motifs to one or more motif dictionaries associated with that outcome type. For example, a computer system may determine that a set of motifs labeled “NewMotif1,” “NewMotif2,” and “NewMotif3” are a set of common motifs in a set of recent event sequences that share the failure type “FAILTYPE1.” Based on a determination that a first motif dictionary is associated with “FAILTYPE1,” some embodiments may then update the first motif dictionary to include “NewMotif1,” “NewMotif2,” and “NewMotif3” even as further transactions occur during HTVP operations.

Some embodiments may determine a motif profile based on the set of motive dictionaries, as indicated by block 312. Some embodiments may perform one or more searches on an incoming event sequence or a recently updated event sequence based on the set of motive dictionaries to form a motif profile. A motif profile may indicate various motif-related values about an event sequence, such as a presence of a motif, a count of the number of times that the motif appears in the sequence, and an order in which the motif is present with respect to other motifs in the sequence for example, a motif profile may indicate that a first motif is present in an event sequence, that the first motif appears five times in the event sequence, that the first motif appears between a second motif and third motif in three instances, and that the first motif appears between the second motif and a fourth motif in two instances. The motif profile may also indicate similar information for a second motif, a third motif, etc.

In many cases, the pattern matching search may be a linear search. A linear search for a motif of length M in a sequence of length N may have a maximum computational complexity equal to O(NM). For example, some embodiments may perform a linear search of the event sequence based on a first motif dictionary and other dictionaries of a set of event sequences. Performing a linear search may include, for each respective motif in the first motif dictionary, detecting whether, how many times, and the positions(s) of the respective motif in the event sequence. In practice, the low length of a motif (e.g., less than three events, less than five events, less than 10 events, etc.) and relatively small number of motifs (e.g., less than five motifs, less than 10 motifs, less than 20 motifs) for a motif dictionary may mean that the actual computational resources required to perform multiple linear searches on a sequence to detect would be far less than that required to use a neural network-based classification model or other classification model.

It should be understood that other pattern-matching algorithms can be used. For example, some embodiments may use a Boyer-Moore algorithm to traverse a sequence. Moreover, a right-to-left scanning pattern matching algorithm, such as the Boyer-Moore algorithm, may be more advantageous to implement in cases where the most recent events of an event sequences are considered most relevant. For example, some embodiments may use a right-to-left scanning that skips unnecessary comparisons by applying the bad character heuristic and good suffix heuristic, where events (e.g., represented as event codes in an event sequence) may be used in lieu of characters. Using a pattern-matching algorithm in general may have a time complexity ranging from O(N/M) to O(NM) (e.g., a pattern-matching algorithm with a common average time complexity of O(N+M)).

In some embodiments, each respective dictionary of a plurality of motif dictionaries may be mutually exclusive from each other, such that any motif in a first motif dictionary of the plurality of motif dictionaries is not found in any of the other dictionaries of the plurality of motif dictionaries. Alternatively, a set of dictionaries may share motifs, such that a motif in a first motif dictionary may also be in a second motif dictionary. Some embodiments may forego repetitively checking motif dictionaries by taking advantage of repeated motifs. For example, a computer system may define a set of three motif dictionaries used to check for errors and anomalies in incoming transaction during high volume operations and then determine what unique motifs are present in each motif dictionary while not being present in any other dictionaries of the three motif dictionaries. For example, the computer system may determine a second set of unique motifs that are unique to the second motif dictionary and a third set of unique motifs that are unique to the third motif dictionary. Some embodiments may then perform a first search to determine a count of motifs of a first motif dictionary in an event sequence, perform a second search to determine a count of the second set of unique motifs in the event sequence, and perform a third search to determine a count of the third set of unique motifs in the event sequence.

When performing a search through a sequence for a motif, some embodiments may determine a count of occurrences the motif, an order in which the motif appears with respect to other motifs, a position of the motif in the sequence or a timestamp indicating the occurrence of with the motif, or other motif-related values of the sequence. Some embodiments may be capable of performing different kinds of searches, where the selection of a search type may be based on a type of request causing the search, be configured by a user, or be selected by a default parameter. For example, some embodiments may receive a request, classify the request with a request type (e.g., "transaction request," "memory allocation request," etc.), and then select a first search type that involves a search for motifs of a first group of motif dictionaries associated with the first search type. Some embodiments may pre-filter an event sequence to remove one or more event types that are considered irrelevant to a sequence analysis. For example, some embodiments may first filter an event sequence to remove or ignore events that include the event code "AC," where inclusion of the event code AC indicates an administrative check.

Some embodiments may further use unique motifs in a motif dictionary for more efficient checking by filtering the number of motifs to unique motifs. For example, some embodiments may select a respective unique set of most common motifs for each respective motif dictionary and search an event sequence based on the unique set of most common motifs instead of searching through every motif of a dictionary. For example, some embodiments may determine a first most common motif that is unique to the first motif dictionary and select a second most common motif that is unique to the second motif dictionary. Some embodiments may then search an event sequence for the first most common motif without searching for at least one other motif of the first motif dictionary. For example, some embodiments may search an event sequence for only for the first most common motif in the first motif dictionary without searching any other motif of the first dictionary, search the event sequence for the top N most common motifs in the first dictionary without searching for motifs that are not one of the top N most common motifs (where N is a non-zero integer greater than one), etc. Some embodiments may further search the event sequence for the second most common motif without searching for at least one other motif of the second motif dictionary. Furthermore, in some embodiments, unique sets of common motifs may share motifs with each other, so long as the combination of motifs are unique between unique sets of common motifs. For example, a first unique set of common motifs may be represented as "[M1, M2, M3]" and a second unique set of common motifs may be represented as "[M1, M2, M8]."

In some embodiments, the search to be performed or the structure/data of a motif profile for an event sequence resulting from a set of searches of the event sequence may be determined from a request type. For example, a transaction request may effectuate a first set of searches for motifs of a first group of motif dictionaries, and record merge request may effectuate a second set of searches for motifs of a second group of motif dictionaries. By using basing different types of searches on different types of request types, some embodiments may increase adaptability of dictionary-based operations to different types of requests.

Some embodiments may prune unseen motifs from a dictionary or prune motifs that fall below an occurrence rate threshold, where such operations may occur during high volume operations. For example, some embodiments may obtain a parameter defining a pre-determined period, where the parameter may be the time itself or a parameter for a function that is then used to determine the length of the pre-determined period. The pre-determined period may be equal to or less than one day, one week, one month, one year, etc. Some embodiments may determine that a motif in a motif dictionary has not been detected in sequences of event histories defined by the pre-determined period of time and, in response, remove the motif from the motif dictionary. Alternatively, some embodiments may determine that the number of times that a motif in a motif dictionary has not been detected for the pre-determined period is less than an occurrence count threshold and, in response, delete the motif.

By actively deleting motifs not observed by sequences of event histories that fall within the pre-defined period during high volume operations, a computer system may ensure that anomaly detection operations continue to occur at an acceptable speed. Furthermore, some embodiments may modify an occurrence count threshold such that a total number of motifs being checked is less than a maximum motif threshold. For example, some embodiments may maintain a list of four motif dictionaries with a combined total of fifty unique motifs. Either before, during, or after performing operations to add a set of new motifs to one or more of the four motif dictionaries, some embodiments may remove one of the original motifs from one or more of the four motif dictionaries using operations described in this disclosure. For example, some embodiments may increase an occurrence count threshold to prune a number of motifs until the total number of motifs returns to fifty.

Some embodiments may select an outcome type based on the motif profile, as indicated by block 318. Some embodiments may select an outcome type, such as a failure type, based on a detected match with a motif dictionary. For example, some embodiments may determine that an event sequence includes a motif of a first motif dictionary and, in response, determine that a failure type associated with that first motif dictionary should be applicable to the event sequence. Alternatively, some embodiments may require more than one match between a motif of the motif dictionary with an event sequence before associating an outcome type of the motif dictionary with the event sequence. For example, some embodiments may require at least two matching motifs, at least three matching motifs, etc. Furthermore, some embodiments may even require that all motifs of the motif dictionary are present in an event sequence before associating the outcome type with the event sequence.

Alternatively, some embodiments may partially or fully match a profile with multiple dictionaries. For example, some embodiments may determine that a motif profile indicating the presence of a first motif, a second motif, a third motif, and a fourth motif matches with both a first motif dictionary that includes the first motif, second motif, and third motif, as well as a second motif dictionary that includes the first motif in the fourth motif. In cases where the outcome types of the first and second dictionaries are not mutually exclusive, some embodiments may select both outcome types for the event sequence. In cases where the outcome types of the first and second dictionaries are mutually exclusive, some embodiments may choose the outcome type based on the most recent matches or determine whether a motif distribution of the event sequence better matches the motif distribution of the first motif dictionary or the second motif dictionary.

Some embodiments may select a category for an event sequence based on a motif sequence. For example, some embodiments may store, in a motif dictionary or in another data structure, an indication of a motif sequence. Some embodiments then later detect the motif sequence when analyzing a recently updated event sequence and compare the motif sequence to the motif dictionary. In some embodiments, the categorization of an event sequence or a record of the event sequence may be based on the detection of the motif sequence.

Some embodiments may determine whether a set of values of the record satisfies a set of criteria associated with the selected outcome type, as indicated by block 324. For example, a computer system may determine a motif profile for a recently updated event sequence and categorize the record based on the motif profile to associate the record with an outcome type. Some embodiments may then search for one or more criteria associated with that outcome type or request type. For example, based on a determination that an event sequence is associated with the failure type "LOCKED_RECORD," some embodiments may lock the record or perform other operations described for block 330.

In some embodiments, the set of criteria may be selected because the set of criteria is mapped or otherwise associated with a request type or a dictionary associated with the request type. For example, a computer system may receive a credit limit modification request to increase a credit limit associated with an account record during HTVP operations, where sophisticated algorithms may be infeasible to implement due to computing limitations. In response, the computer system may perform operations described elsewhere in this disclosure to retrieve a set of dictionaries and check the motifs of the retrieved dictionaries to detect the presence of flagged motifs to determine whether to increase the credit limit field of account record. For example, the computer system may retrieve a first dictionary associated with the outcome type "permit limit increase" and determine whether any of the motifs of that first dictionary are detected in the event history of the account record within a past six months. If so, some embodiments may determine that the set of criteria is satisfied and, in response, increase the credit limit field by the amount indicated in the credit limit modification request. Alternatively, the computer system may retrieve a second dictionary associated with the outcome type "red flag and lock account" and determine that a motif of the second dictionary is detected in the event history of the account record within a past six months. As a result of detecting the motif of the second dictionary, the computer system may determine that a set of criteria associated with locking activity is satisfied. In response, the computer system may then prevent modifications to the credit limit field and instead (1) lock the account to prevent further database transactions from modifying fields of the account record and (2) send an alert to a second user account indicating anomalous activity.

In some embodiments, a set of criteria may be based on a change in categories determined from motifs. For example, a computer system may have originally analyzed an earlier segment of an event sequence of a user to determine an earlier motif profile based on a set of motif dictionaries. The computer system may then have analyzed a later segment of the event sequence to determine a later motif profile based on the same set of motif dictionaries. Based on a comparison between the two motif profiles, the computer system may determine that one or more categories (e.g., outcome types, demographic profile, etc.) associated with the earlier motif profile is different from a category associated with the later motif profile. In response to determining that the two categories are different, some embodiments may determine that a set of criteria associated with the outcome type is satisfied. For example, if a record's earlier motif profile indicates that the record is associated with the demographic group "chef" and the record's later motif profile indicates that the record is associated with the demographic group "banker," some embodiments may determine that a set of criteria associated with the outcome type is satisfied and that a corresponding record may be modified (e.g., modified using operations similar to or the same as those described for block 330.

If the set of values of the record satisfies the set of criteria associated with the selected outcome type, operations of the flowchart 300 may proceed to operations described by block 330. Otherwise, operations of the flowchart 300 may return to operations described by block 308 after receiving an additional request or set of updates to one or more event sequences.

Some embodiments may modify a record based on the request or an action mapped to the outcome type, as indicated by block 330. Some embodiments may modify a request based on a request and an action mapped to an outcome type. For example, some embodiments may receive a request to change a security permission for an account record. After determining, based on a motif profile of an event sequence associated with the event record, that the event sequence is associated with a first failure type "FRAUD_CONFIRMED," some embodiments may lock the account record. Alternatively, some embodiments may determine that the event sequence is associated with a second failure type "POSSIBLE_FRAUD" and, in response, reduce a security value of the account record to prevent a user of the account record from accessing certain data or manipulating certain fields of the account record.

Various types of record modification operations may be performed. For example, some embodiments may modify a field stored in a record, such as increasing one or more limits stored in a field of the record or effectuating a transaction between two accounts to increase a field of a first record by an amount and decreasing a field of a second record by the amount. Some embodiments may modify a record by locking the record to prevent one or more database transactions from affecting the record. Furthermore, some embodiments may delete a record or create a record.

As described elsewhere, motif dictionaries used for anomaly detection or other operations can be localized to a specific region defining a data center. In cases where a dictionary is modified during real-time HTVP, different versions of the same dictionary can be produced for different regions. For example, some embodiments may apply HTVP operations to determine that a first version of a dictionary was updated using recent event sequences that was updated in sequence. Some embodiments may then detect a match between at least one motif of the first version and the event sequence and then broadcast the first version to a second data center based on the detected match. After receiving the broadcasted version at the second data center, the second data center may then update its own version of the first motif dictionary to include any additional motifs of the version from the first data center. The second data center may then use the updated first motif dictionary to form a motif profile of one or more event sequences obtained by the second data center.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

It should be noted that the features and limitations described in any one embodiment may be applied to any other embodiment herein, and a flowchart or examples relating to one embodiment may be combined with any other embodiment in a suitable manner, done in different orders, or done in parallel. Furthermore, not all operations of a flowchart need to be performed. In addition, the systems and methods described herein may be performed in real-time. It should also be noted that the systems and/or methods described above may be applied to, or used in accordance with, other systems and/or methods.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on one or more non-transitory, machine-readable media (e.g., a set of machine-readable storage media), such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods.

In some embodiments, the various computer systems and subsystems illustrated in FIG. 1 or FIG. 2 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record. Additionally, as used in the specification, "a portion" refers to a part of, or the entirety of (i.e., the entire portion), a given item (e.g., data) unless the context clearly dictates otherwise.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

Enumerated Embodiments

The present techniques will be better understood with reference to the following enumerated embodiments:

1. A method comprising: detecting event motifs based on a shared occurrence of the event motifs across event sequences; grouping the event motifs into a set of motif groups based on the categories associated with the event sequences; performing a search on an event sequence for a record based on the first event motifs to determine a motif profile; determining whether a set of criteria is satisfied based on the motif profile; and in response to a determination that the set of criteria is satisfied, modifying the record based on an action mapped to the first category.

2. A method comprising: detecting event motifs based on a shared occurrence of the event motifs across historical event sequences, wherein each respective history indicates a set of failures; grouping the event motifs into a set of motif dictionaries based on the set of failures, the set of motif dictionaries comprising a first motif dictionary associated with a first category and a second motif dictionary associated with a second category; performing a search on an event sequence for a record based on the first motif dictionary and the second motif dictionary to determine a motif profile indicating a first count of matching motifs for the first motif dictionary and a second count of matching motifs for the second motif dictionary; determining whether a set of criteria is satisfied based on the motif profile; and in response to a determination that the set of criteria is satisfied, modifying the record based on an action mapped to the first category.

3. A method comprising: detecting event motifs based on shared occurrences of the event motifs across a plurality of event histories, wherein each respective history of the plurality of event histories indicates at least one failure type of a set of failure types; grouping the event motifs into a set of motif dictionaries based on the set of failure types, the set of motif dictionaries comprising a first motif dictionary associated with a first failure type and a second motif dictionary associated with a second failure type; obtaining a request to modify a record during high volume operations; performing, in response to the request, a pattern matching search on an event sequence of the record based on the first motif dictionary and the second motif dictionary to (1) determine a motif profile indicating a first count of matching motifs for the first motif dictionary and a second count of matching motifs for the second motif dictionary and (2) select the first failure type in lieu of the second failure type based on the motif profile; and in response to a determination that values of the record satisfy a record parameter threshold associated with the first failure type, modifying the record based on the request and an action mapped to the first failure type.

4. A method comprising: detecting event motifs that are shared occurrence across two or more event histories of a plurality of event histories; grouping the event motifs into a set of motif dictionaries based on a set of failure types, the set of motif dictionaries comprising a first motif dictionary associated with a first failure type of the set of failure types and a second motif dictionary associated with a second failure type of the set of failure types; obtaining a request to modify a record; performing, in response to the request, a pattern matching search on an event sequence of the record based on the first motif dictionary and the second motif dictionary to determine a motif profile indicating a first count of matching motifs for the first motif dictionary and a second count of matching motifs for the second motif dictionary; determining a result indicating that a set of failure criteria is satisfied by a set of values of the record and the motif profile; and in response to the result, modifying the record based on the request and an action mapped to the first failure type.

5. The method of any of the above embodiments, wherein the record is a first record, and wherein obtaining the request comprises obtaining the request during a first duration at a first data center, further comprising: obtaining a plurality of transactions for a plurality of recent event sequences associated with a plurality of records, wherein the plurality of records comprising the first record, and wherein the plurality of recent event sequences are updated during the first duration; obtaining an indication of the first failure type for each respective record of the plurality of records; detecting a set of common motifs based on the plurality of recent event sequences, wherein the set of common motifs is not initially in the first motif dictionary; and updating the first motif dictionary to add a motif of the set of common motifs.

6. The method of any of the above embodiments, wherein a first version of the first motif dictionary is stored in a memory of a first data center, and wherein updating the first motif dictionary comprise updating the first version, further comprising: detecting a match between at least one motif of the first version and the event sequence; broadcasting the first version to a second data center based on the detected match; updating a second version of the first motif dictionary at the second data center based on the first version; receiving, at the second data center, a second event sequence indicating updates to a second record; and performing a second pattern matching search on the second event sequence using computing resources of the second data center based on the second version to obtain a second motif profile after the second version is updated.

7. The method of any of the above embodiments, further comprising: detecting an indication that an action type associated with the first failure type has been mapped to a third failure type, wherein a third motif dictionary is associated with the third failure type; comparing the first motif dictionary with the third motif dictionary to determine a set of additional motifs present in the third motif dictionary; and updating the first motif dictionary to add the set of additional motifs to the first motif dictionary.

8. The method of any of the above embodiments, wherein a motif of the first motif dictionary is identical to a motif of the second motif dictionary.

9. The method of any of the above embodiments, further comprising: obtaining a parameter defining a pre-determined period; determining an occurrence rate of a second motif of the first motif dictionary based on sequences of event histories indicated to have occurred within the pre-determined period; determining a second result indicating that the occurrence rate is less than an occurrence count threshold; and removing the second motif from the first motif dictionary.

10. The method of any of the above embodiments, wherein the record is a first record, and wherein the motif profile is a later motif profile, and wherein performing the pattern matching search comprises performing a later pattern matching search on a later segment of the event sequence, further comprising: performing an earlier pattern matching search on an earlier segment of the event sequence based on the first motif dictionary and the second motif dictionary to determine an earlier motif profile; assigning the record with an earlier category based on the earlier motif profile; assigning the record with a later category based on the later motif profile; determining a second result indicating that the earlier category and the later category are different; and modifying the record comprises modifying the record based on the second result.

11. The method of any of the above embodiments, wherein: detecting the event motifs comprises determining a subset of event histories of the plurality of event histories in which a set of candidate motifs is present; and grouping the event motifs comprises: determining a second result indicating that the subset of event histories indicate failures of the first failure type; and updating the first motif dictionary to associate the first motif dictionary with the first failure type and to comprise the set of candidate motifs based on the second result.

12. The method of any of the above embodiments, wherein detecting the event motifs comprises: determining a count of a subset of event histories in which a candidate motif is present; determining a second result indicating that the count satisfies a minimum event history threshold; and updating the first motif dictionary to comprise the candidate motif based on the second result.

13. The method of any of the above embodiments, further comprising: filtering the plurality of event histories for a subset of event histories that share the first failure type; grouping a plurality of event motifs by determining that, for each respective event motif of the plurality of event motifs, the respective event motif is present in at least two of the subset of event histories; updating the first motif dictionary to comprise the plurality of event motifs.

14. The method of any of the above embodiments, further comprising storing the first motif dictionary as an unordered set.

15. The method of any of the above embodiments, wherein the motif profile is a first motif profile, and wherein the motif profile is a second motif profile, further comprising: determining a second motif profile for a second event sequence based on the first motif dictionary and the second motif dictionary; detecting an action type associated with the second motif profile; determining a set of matching motifs between the second event sequence and the second motif dictionary; and generating a new motif dictionary based on motifs of the first motif dictionary and the set of matching motifs.

16. The method of any of the above embodiments, further comprising: determining a set of unique motifs possessed by the second motif dictionary and not possessed by the first motif dictionary, wherein determining the motif profile comprises: performing a pattern matching search of the event sequence to detect one or more motifs of the first motif dictionary; and performing a second set of pattern matching searches of the event sequence to detect one or more motifs of the set of unique motifs.

17. The method of any of the above embodiments, further comprising: selecting a first most common motif that is unique to the first motif dictionary; selecting a second most common motif that is unique to the second motif dictionary, wherein performing the search on the event sequence comprises: performing a first search of the event sequence to detect the first most common motif without performing a search on the event sequence to detect at least one other motif of the first motif dictionary; and performing a second search of the event sequence to detect the second most common motif without performing a search on the event sequence to detect at least one other motif of the second motif dictionary.

18. The method of any of the above embodiments, further comprising: obtaining, at a first data center, a request to modify the record during high volume operations of the first data center, wherein performing the search comprises performing the search in response to receiving the request; and wherein modifying the record comprises modifying the record based on the request.

19. The method of any of the above embodiments, further comprising: broadcasting the first motif dictionary to an additional data center based on a match, wherein receiving the first motif dictionary causes the additional data center to perform searches based on the first motif dictionary.

20. The method of any of the above embodiments, further comprising: detecting an indication that an action type associated with the first category has been mapped to a third category, wherein a third motif dictionary is associated with the third category; comparing the first motif dictionary with the third motif dictionary to determine a set of additional motifs present in the third motif dictionary; and updating the first motif dictionary to add the set of additional motifs to the first motif dictionary.

21. The method of any of the above embodiments, wherein the motif profile indicates sequences of motifs.

22. A tangible, non-transitory, machine-readable medium storing instructions that, when executed by a data processing apparatus, cause the data processing apparatus to perform operations comprising those of any of embodiments 1-21.

23. A system comprising one or more processors; and memory storing instructions that, when executed by the processors, cause the processors to effectuate operations comprising those of any of embodiments 1-21.

24. A system comprising means for performing any of embodiments 1-21.

What is claimed is:

1. A system for securely modifying records during high volume processes by using motif profiles, the system comprising one or more processors and one or more non-transitory media storing program instructions that, when executed, cause the one or more processors to perform operations comprising:

storing, in respective data centers, versions of motif dictionaries comprising a first motif dictionary associated with a first failure type and a second motif dictionary associated with a second failure type, the first motif dictionary comprising a plurality of ordered event sub-sequences that recur across a plurality of event histories;

performing a search on an earlier segment of an event sequence for a record using the first motif dictionary and the second motif dictionary to obtain an earlier motif profile, wherein an earlier category assignment for the record is derived from the earlier motif profile;

in response to obtaining a request to modify the record during high volume operations, performing a first pattern matching search on the event sequence of the record using a first version of the first motif dictionary and a version of the second motif dictionary that are stored at a first data center to obtain a motif profile indicating a first count of matching motifs for the first motif dictionary and a second count of matching motifs for the second motif dictionary, wherein performing the first pattern matching search comprises performing a later pattern matching search on a later segment of the event sequence to obtain the motif profile, wherein a later category assignment for the record is derived from the motif profile;

in response to (i) a set of values of the record satisfying a record parameter threshold associated with a failure type identified using the motif profile and (ii) an indication that the earlier category assignment and the later category assignment are different, modifying the record based on the request and using an action mapped to the first identified failure type;

in response to a detected match between at least one motif of the first version of the first motif dictionary and the event sequence, broadcasting, via a network, the first version of the first motif dictionary to the second data system to update updating a second version of the first motif dictionary, stored at a second data center, using the first version of the first motif dictionary; and in response to obtaining, at the second data center, a second event sequence to modify a second record, performing a second pattern matching search on the second event sequence using the updated second version of the first motif dictionary stored at the second data center to obtain a second motif profile.

2. A method comprising:

storing, at a first data system configured to process high data volumes including over 1000 transaction requests per second, motif dictionaries comprising a first motif dictionary associated with a first category and a second motif dictionary associated with a second category, the first motif dictionary comprising a plurality of event motifs;

performing, by the first data system, a search on an earlier segment of an event sequence for a record based on the first motif dictionary and the second motif dictionary to obtain an earlier motif profile, wherein an earlier category assignment for the record is derived from the earlier motif profile;

performing, by the first data system, a search on a later segment of the event sequence for the record based on the first motif dictionary and the second motif dictionary to obtain a motif profile indicating a first count of matching motifs for the first motif dictionary and a second count of matching motifs for the second motif dictionary, wherein a later category assignment for the record is derived from the motif profile;

determining, by the first data system, whether a set of criteria is satisfied based on the motif profile;

in response to a determination that the set of criteria is satisfied and an indication that the earlier category assignment and the later category assignment are different, modifying, by the first data system, the record based on an action mapped to the first category;

after updating the first motif dictionary to obtain a first version of the first motif dictionary, detecting the match between at least one motif of the first version and the event sequence; and broadcasting, via a network, the first version of the first motif dictionary to a second data system based on the detected match to update a second version of the first motif dictionary stored at the second data system.

3. The method of claim 2, wherein the first motif dictionary is associated with a first failure type, and the second motif dictionary is associated with a second failure type different from the first failure type; and wherein updating the second version of the first motif dictionary stored at the second data system comprises updating the second data system to store an updated motif dictionary associated with the first failure type, the method further comprising:

based on a second event sequence indicating a modification to a second record, performing a second pattern matching search on the second event sequence using the updated motif dictionary stored at the second data system to obtain a second motif profile.

4. The method of claim 3, wherein performing the second pattern matching search on the second event sequence comprises performing the second pattern matching search on the second event sequence using computing resources of the second data system and the second version to obtain the second motif profile after the second version is updated.

5. The method of claim 2, wherein the first motif dictionary is associated with a first failure type, and the second motif dictionary is associated with a second failure type different from the first failure type, the method further comprising:

detecting an indication that an action type associated with the first failure type has been mapped to a third failure type associated with a third motif dictionary; and based on the indication, updating the first motif dictionary to add, to the first motif dictionary, a set of additional motifs present in the third motif dictionary.

6. The method of claim 2, wherein the first motif dictionary is associated with a first failure type, and the second motif dictionary is associated with a second failure type different from the first failure type, the method further comprising:

obtaining a plurality of transactions for a plurality of recent event sequences associated with a plurality of records, wherein the plurality of records comprises the record;

obtaining an indication of the first failure type for each respective record of the plurality of records;

detecting a set of common motifs based on the plurality of recent event sequences, wherein the set of common motifs is not initially in the first motif dictionary; and updating the first motif dictionary to add a motif of the set of common motifs.

7. The method of claim 2, further comprising:
obtaining a parameter defining a pre-determined period;
determining an occurrence rate of a given motif of the first motif dictionary based on sequences of event histories indicated to have occurred within the pre-determined period;
determining a second result indicating that the occurrence rate is less than an occurrence count threshold; and
based on the second result, removing the given motif from the first motif dictionary.

8. The method of claim 2,
storing, at the first data system, the record with the earlier category assignment based on the earlier motif profile; and
storing, at the first data system, the record with the later category assignment based on the motif profile.

9. The method of claim 2, wherein the first motif dictionary is associated with a first failure type, and the second motif dictionary is associated with a second failure type different from the first failure type, the method further comprising:
determining a subset of event histories of a plurality of event histories in which a set of candidate motifs is present;
determining a second result indicating that the subset of event histories indicate failures of the first failure type; and
updating the first motif dictionary to associate the first motif dictionary with the first failure type and to comprise the set of candidate motifs based on the second result.

10. The method of claim 2, further comprising:
determining a count of a subset of event histories of a plurality of event histories in which a candidate motif is present;
determining a second result indicating that the count satisfies a minimum event history threshold; and
updating the first motif dictionary to comprise the candidate motif based on the second result.

11. The method of claim 2, further comprising:
filtering a plurality of event histories for a subset of event histories that share the first category;
grouping the plurality of event motifs by determining that, for each respective event motif of the plurality of event motifs, the respective event motif is present in at least two of the subset of event histories; and
updating the first motif dictionary to comprise the plurality of event motifs.

12. One or more non-transitory, machine-readable media storing program instructions that, when executed, perform operations comprising:
storing, at a first data system configured to process high data volumes including over 1000 transaction requests per second, motif dictionaries comprising a first motif dictionary associated with a first category and a second motif dictionary associated with a second category, the first motif dictionary comprising a plurality of event motifs;
performing, by the first data system, a search on an earlier segment of an event sequence for a record based on the first motif dictionary and the second motif dictionary to obtain an earlier motif profile, wherein an earlier category assignment for the record is derived from the earlier motif profile;
performing, by the first data system, a search on a later segment of the event sequence for the record based on the first motif dictionary and the second motif dictionary to obtain a motif profile indicating a first count of matching motifs for the first motif dictionary and a second count of matching motifs for the second motif dictionary, wherein a later category assignment for the record is derived from the motif profile;
determining, by the first data system, whether a set of criteria is satisfied based on the motif profile;
in response to a determination that the set of criteria is satisfied and an indication that the earlier category assignment and the later category assignment are different, modifying, by the first data system, the record based on an action mapped to the first category;
after updating the first motif dictionary to obtain a first version of the first motif dictionary, detecting the match between at least one motif of the first version and the event sequence; and
broadcasting, via a network, the first version of the first motif dictionary to a second data system based on the detected match to update a second version of the first motif dictionary stored at the second data system.

13. The one or more non-transitory, machine-readable media of claim 12, further comprising storing the first motif dictionary as an unordered set of event motifs.

14. The one or more non-transitory, machine-readable media of claim 12, the operations further comprising:
determining a second motif profile for a second event sequence based on the first motif dictionary and the second motif dictionary;
detecting an action type associated with the second motif profile;
determining a set of matching motifs between the second event sequence and the second motif dictionary; and
generating a new motif dictionary based on motifs of the first motif dictionary and the set of matching motifs.

15. The one or more non-transitory, machine-readable media of claim 12, further comprising:
selecting a first most common motif that is unique to the first motif dictionary; and
selecting a second most common motif that is unique to the second motif dictionary, wherein performing the search on the later segment of the event sequence comprises:
performing a first search of the later segment of the event sequence to detect the first most common motif without performing a search on the later segment of the event sequence to detect at least one other motif of the first motif dictionary; and
performing a second search of the later segment of the event sequence to detect the second most common motif without performing a search on the later segment of the event sequence to detect at least one other motif of the second motif dictionary.

16. The one or more non-transitory, machine-readable media of claim 12, the operations further comprising:
obtaining, at a first data center, a request to modify the record during high volume operations of the first data center, wherein performing the search on the later segment of the event sequence comprises performing the search on the later segment of the event sequence in response to receiving the request; and wherein modifying the record comprises modifying the record based on the request.

17. The one or more non-transitory, machine-readable media of claim 12, the operations further comprising:
based on a second event sequence indicating a modification to a second record, performing a second pattern matching search on the second event sequence using computing resources of the second data system and the second version of the first motif dictionary to obtain a second motif profile after the second version of the first motif dictionary is updated.

18. The one or more non-transitory, machine-readable media of claim 12, the operations further comprising:

detecting an indication that an action type associated with the first category has been mapped to a third category associated with a third motif dictionary; and updating the first motif dictionary to add, to the first motif dictionary, a set of additional motifs present in the third motif dictionary.

19. The one or more non-transitory, machine-readable media of claim 12, wherein the motif profile indicates sequences of motifs.

20. The one or more non-transitory, machine-readable media of claim 17, wherein the first data system and the second data system are respectively located at a first geographic region and a second geographic location.

* * * * *